(12) United States Patent
Wormsley et al.

(10) Patent No.: US 9,530,030 B2
(45) Date of Patent: Dec. 27, 2016

(54) RECONFIGURABLE PAYMENT DEVICE

(71) Applicant: HEARTLAND PAYMENT SYSTEMS, INC, Princeton, NJ (US)

(72) Inventors: Jeffrey Wormsley, Chattanooga, TN (US); Leanne Price, Alexander City, AL (US); Ron Farmer, Roswell, GA (US)

( * ) Notice: Subject to any disclaimer, the term of this patent is extended or adjusted under 35 U.S.C. 154(b) by 169 days.

(21) Appl. No.: 14/106,738

(22) Filed: Dec. 14, 2013

(65) Prior Publication Data

US 2014/0166747 A1    Jun. 19, 2014

Related U.S. Application Data

(60) Provisional application No. 61/797,769, filed on Dec. 14, 2012.

(51) Int. Cl.
*G06K 7/08* (2006.01)
*G07F 7/08* (2006.01)

(52) U.S. Cl.
CPC ............. *G06K 7/082* (2013.01); *G07F 7/0873* (2013.01)

(58) Field of Classification Search
USPC ........................ 235/439, 440, 441
See application file for complete search history.

(56) References Cited

U.S. PATENT DOCUMENTS

| | | | |
|---|---|---|---|
| 2002/0032875 A1* | 3/2002 | Kashani | G06F 1/1632 713/300 |
| 2003/0132294 A1* | 7/2003 | Gomez | G06Q 20/00 235/383 |
| 2005/0236480 A1* | 10/2005 | Vrotsos | G06Q 20/341 235/439 |

FOREIGN PATENT DOCUMENTS

JP    2009112384    * 11/2010    ............. G03G 15/00

* cited by examiner

*Primary Examiner* — Michael G Lee
*Assistant Examiner* — Tabitha Chedekel
(74) *Attorney, Agent, or Firm* — Rueppell Consulting; Chris Rueppell (57) ABSTRACT

A reconfigurable electronic payment device allows for the capture and transmission of customer transaction information captured from the "swipe" of an electronic payment tool, such as a credit or debit card or any such tool that includes a magnetic stripe upon which information can be stored and read from. The device provides a second housing with a reader head guide assembly, including a magnetic card reader adapter, which can be repositioned about a first housing of the electronic payment device. This repositioning capability can enhance the ease of use of the device and efficiency by which the swipe of a credit or debit card can be performed. The repositioning capability further promotes the mounting of the electronic payment device upon many different surfaces.

20 Claims, 6 Drawing Sheets

FIG. 6

RECONFIGURABLE PAYMENT DEVICE

CROSS REFERENCE TO RELATED APPLICATION

This application claims the benefit of U.S. Provisional Application No. 61/797,679, filed Dec. 14, 2012, which is hereby incorporated herein by reference in its entirety.

BACKGROUND

The present invention relates to a reconfigurable payment device, methods and systems that enable products and services to be purchased by means of electronic payment transactions, such as by means of credit and debit card transactions, and more particularly to methods and apparatuses that enhance the efficiency of the execution of these types of transactions.

At the point of sale, the electronic payment industry has typically relied upon payment devices that utilize a swipe card reader (aka., magnetic stripe reader, card reader, mag-stripe reader, mag head) for capturing customer transaction information from a customer electronic payment card. These traditional payment devices can provide their magnetic stripe reading functionality in different ways, such as an external swipe reader through which a customer passes a card (i.e., typical retail point of sale device) and an insertion reader (such as those found on a gas pump) into which the customer inserts a card for reading by the payment device. Many of the devices and methods for performing these types of electronic payment transactions, which includes the performance of electronic credit and debit transactions, have been in use for decades. To address various specific needs for enabling the execution of electronic payment transactions unique physical and process requirements have been developed for electronic payment devices and included into the transaction process.

Traditionally for various industries, such as in the laundry industry, there have been primarily two methods of mounting card readers: 1. First is the insertion reader, which is typically mounted partially inside of a laundry machine. These readers either require totally replacing the cash payment on the machine, or developing complicated brackets and enclosures to attach them to the machine, often requiring significant alteration of the machine. 2. Second is the surface mounted right hand vertical swipe reader that has been used to reduce or eliminate the number of brackets needed, and to allow the existing coin payment to remain in place.

It is common for electronic payment devices to be mounted upon different surfaces. These surfaces may vary and be provided by many different types of structures, such as machines and other mediums upon which a payment device may be fixated. It may be the case that various obstructions may exist on these surfaces which can impact upon the use of the electronic payment devices. Commonly, electronic payment devices have dealt with the problem of obstructions to the swipe path in various ways. One method has been to locate the device in a different, less convenient location, making it more difficult to use by the cardholder. Another method used has been to place an extender behind the device to bring the swipe path out beyond the obstruction. A third has been to place the reader on a bracket that puts the device above the machine and/or surface to allow room to swipe the card. These latter methods require additional parts to be purchased and installed and cause the entire device to protrude farther from the machine and/or surfaces, where it is both aesthetically displeasing as well as an obstruction.

It has typically been the case that on many laundry machines the traditional payment devices, particularly the insertion readers, used in the credit card industry do not provide a convenient mounting option for laundry machines. They cannot be mounted to a laundry machine without modifications (i.e., cutting) to the machine or developing a mounting assembly, such as through the use of a number of brackets to hold the card readers to the machine and make it possible to access the read head. Readers that mount to the surface of the machine have been developed to overcome these limitations, but to date many of these devices cannot overcome obstructions presented and/or provide the needed clearance required for swiping a card. For instance, many of these devices present "right hand" vertical swipe terminals such as found in retail and vending applications. These terminals have the inherent limitation that they offer only one orientation of the swipe. Right hand vertical swipe readers cannot be used on many laundry machines and other surfaces that are considered "card ready" due to the clearance required for swiping a card. There may be some readers that use an off-the-shelf swipe bar that is independent of the rest of the laundry device. While these devices may not have a "right-handedness", they typically are not considered a fully integrated device nor inherently provide capabilities to overcome obstructions to the swiping of a card.

It can also be the case that these machines and/or surfaces have obstructions, such as a door, coin vault or other items, that extend beyond the face or front of the machine and/or from the surface that are also impediments to using a right hand vertical swipe. It is often the case that additional mounting assemblies, such as brackets, are required to extend them past these obstructions and provide the necessary swipe clearance. Card readers are also used with "stacked" machines, where one machine (e.g., dryer) is on top of another (e.g., washing machine). This machine configuration requires two card readers where it may often be the case that one card reader is located above the other card reader. In such a configuration a right-hand card reader, because the lower reader blocks the swipe from the upper, may be inoperable. It can also be the case that meeting the specifications of other requirements, such as ADA requirements, make insertion readers and right hand swipe readers difficult to mount on and be used upon various machines, such as large high capacity commercial machines, and surfaces.

It is therefore desired to provide an apparatus, methods and systems that address these weaknesses in present electronic payment devices used in the performance of electronic payment transactions.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in systems, methods and apparatuses that perform electronic payment transactions.

In an aspect of an embodiment consistent with the current invention, a reconfigurable electronic payment device is provided. The device includes a first housing connected with a second housing. The second housing includes a swipe card reader and is repositionable about the first housing through a connection assembly. The connection assembly provides a physical connection between the first and second housing. The connection assembly further provides a communicative coupling between the first and second housing allowing for the capture and transmission of electronic payment information.

In another aspect of an embodiment consistent with the invention, a system for performing an electronic payment transaction is provided. The system enables the communication of electronic transaction information between a reconfigurable electronic payment device and an electronic transaction payment network. This communicative capability enables the execution (capture, authorization, settlement) of an electronic payment transaction.

In another aspect of an embodiment consistent with the invention, a method of performing an electronic payment transaction comprises operating a reconfigurable electronic payment device in a location that allows for the capture of electronic payment information. The reconfigurable electronic payment device is in communication with an electronic payment transaction processing network and transmits the information to the network. The network transmits authorization information back to the reconfigurable electronic payment device for allowing or denying the attempted transaction.

BRIEF DESCRIPTION OF THE DRAWINGS

The objects and advantages of the invention will be understood by reading the following detailed description in conjunction with the drawings in which.

DETAILED DESCRIPTION

This invention consists of a reconfigurable electronic transaction payment apparatus (the "device") generally configured with component features comprising a first and second housings, a reader head guide assembly and a back plate. The interconnection, both physical and communicatively, between these component features allows for the repositioning of the second housing about the first housing. This repositioning of the second housing further allows for the repositioning of the reader head guide assembly. The repositioning of the reader head guide assembly allows the position of the card swipe reader that is presented to a user for the swiping of a user's card to be moved about the device. This enables the card swipe reader to be moved away from or avoid any obstacles that are presented by the surface and/or object upon which the device is mounted. Generally, the shape of the device is defined as cubical or box-like, however, alternate polygonal configurations, dimensions, and contouring may be employed to define the overall shape of the device.

In operation, the reconfigurable device enables the performance of actions in the process of an electronic payment transaction. More specifically, the device allows a user to perform a "card swipe" of their credit or debit card. From the card swipe the device collects the payment information from the credit or debit card and communicates necessary information to and receives information from a transaction processing network. It is to be understood that communication between the device and the transaction processing network is accomplished through the use of a wireless communication system, which can communicate using encryption protocols, such as the encrypted Zigbee protocol. The means of communication employed by the device may vary, such as a wired or wireless communication means, and may include variation in the hardware employed, protocols used, encryption(s) used, and any other aspects or functional capabilities that are used to provide the communication functionality for the device without departing from the scope and spirit of the current invention. It is also contemplated that the communication means of the device enable its communication with various other computing devices and networks.

In the embodiments of FIGS. 1a-1h, the device 10 is established with the following dimensions: width of 4.5 inches, height of 3.875 inches and depth of 1.25 inches. The device 10 provides a display 122 that is a high visibility, graphical liquid crystal display. The size of the display 122 may vary, preferably ranging from 2 inches to 4 inches, but may be of any size contemplated. The housings are made from thermal plastic through an injection molding process. The material provides an impact resistance for the device. The device 10 accepts AC or DC power from 9V up to and including 30V. The power may be provided to the device directly from a machine to which the device is connected or via an additional power adapter that taps the line voltage and provides 24VDC. The current invention comprises two such power adapters, one for 110VAC and another for 220VAC. Optimal operation ranges include temperature range from 41° F. to 104° F. (+5° C. to +40° C.) and humidity range from 20%-80%, relative, and non-condensing. It is to be understood that the device can operate outside of these optimal ranges.

As will be described herein, changes as contemplated may be included without departing from the scope and spirit of the current invention. For example, the back plate may be integral with the first housing, the component features included may vary, the generally planar nature of the surfaces of the device may be altered and the size of the device, including the component features presented by the device, may be enlarged or reduced. The communication system and protocols may be varied, the display may use alternative technologies, differing power requirements may be used and optimal operation ranges may increase or decrease relative to those previously stated.

In embodiments of the current invention, the first housing 100 may be referred to as an "inner base assembly", "puck assembly" or "puck". The puck 100 is constructed of a durable material, such as a plastic material, and may be constructed by various processes, such as an injection molding process, forming the puck 100 into a desired shape. However, other materials and methods of construction may be used to provide the puck of the current invention.

The puck 100 comprises a plate 102 having an outer ("face") surface 104 and inner surface 106 defined by top 107, bottom 108, right 109 and left 110 edges. An access point 120 (e.g., plate cut-out) extends through and creates a receiving area within the plate 102. Located within the access point 120 is a display 122, which provides a user perceptible display of information. A keypad overlay 126 is established on the outer surface 104 proximal to the display 122. Connected about the edges of the inner surface 106 are a first 112, second 113, third 114 and fourth 115 inner walls and at each corner of the inner surface 106 is a corresponding first 130, second 132, third 134, and fourth 136 inner post. The plate, walls and posts shall have defined dimensions that enable the coupling of the puck 100 with a second housing 200 (defined below) of the reconfigurable payment device 10 of the current invention. Connected to the inner surface 106 of the puck 100 is a printed circuit board (PCB) 180 that is operationally coupled with various component features, including the display 122, keypad overlay 126 and others.

The plate 102 generally establishes a planar outer surface for the puck 100. The dimensions of the plate 102 are established to enable its connection and operation with the second housing 200 of the device 10. Alternatively, the outer surface 104 of the puck may exhibit, entirely or only in part, a non-planar shape, such as a curved or contoured shape. For instance, the outer surface 104 may be established with a dome-shaped or arc-shaped contouring. Any amount of curvature or contouring provided to the outer surface 104 of the puck plate 102 shall ensure the usability of component features of the puck 100 and its functional capability as a component feature of the device 10. Thus, it is contemplated that any curvature or contouring provided may be "gentle" in its amount.

Figure 1A:
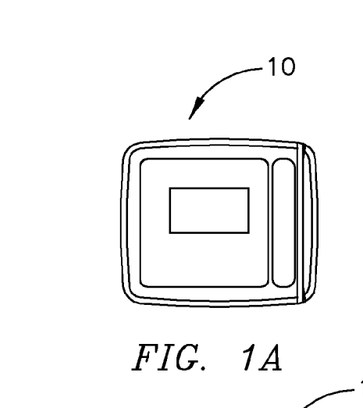
FIGS. 1a-1h are illustrations of a reconfigurable payment device including a first housing connected to a second housing, wherein the second housing is presented in multiple orientations relative to the first housing, for use in an electronic credit and debit transaction system.
Figure 1B:
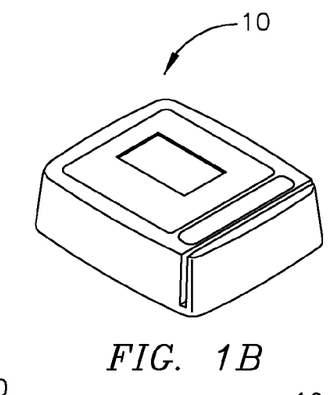
Figure 1C:
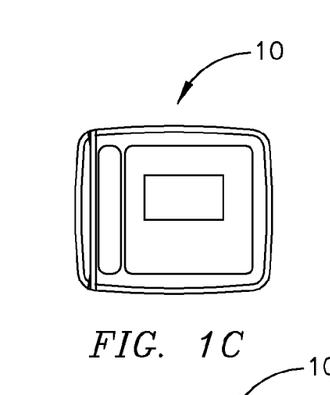
Figure 1D:
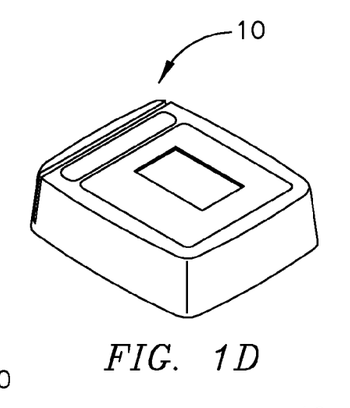
Figures 1E, 1F, 1H:
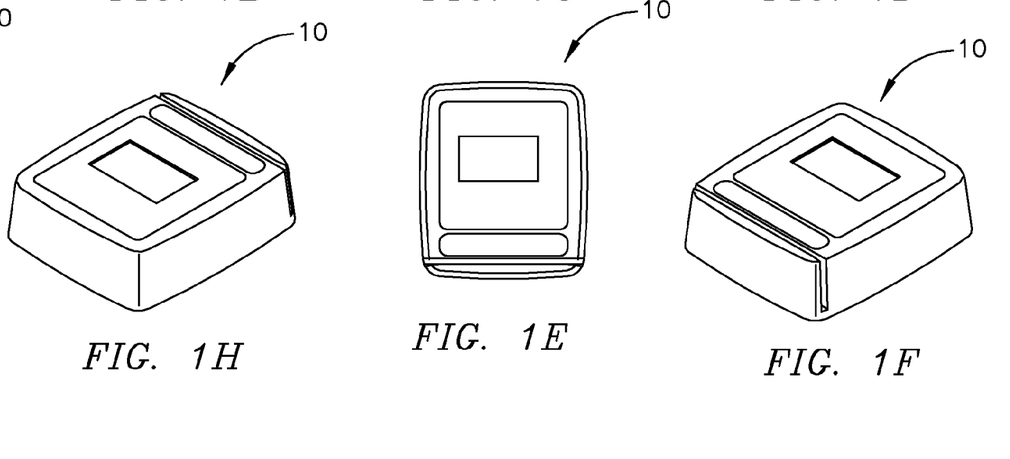
Figure 1G:
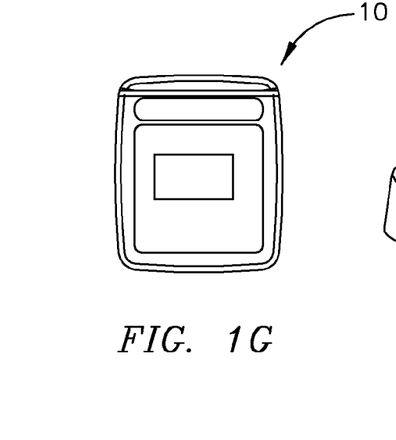
Figure 2A:
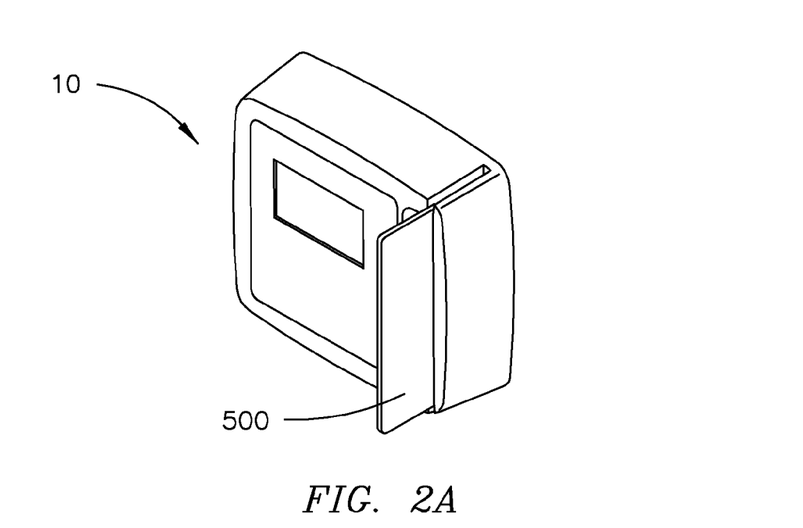
FIGS. 2A and 2B illustrate and show an exploded view of a reconfigurable payment device including the first housing ("puck assembly"), second housing ("ring assembly"), a reader head guide assembly, and back plate of the current invention.
Figure 2B:
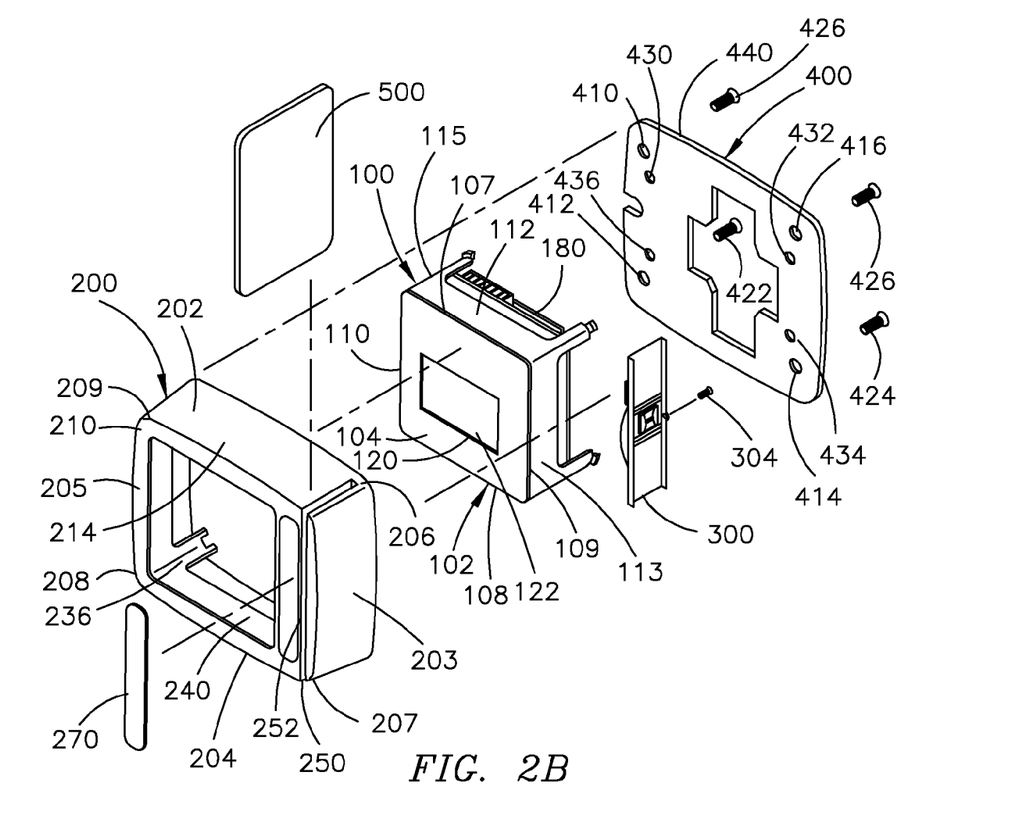
Figure 3A:
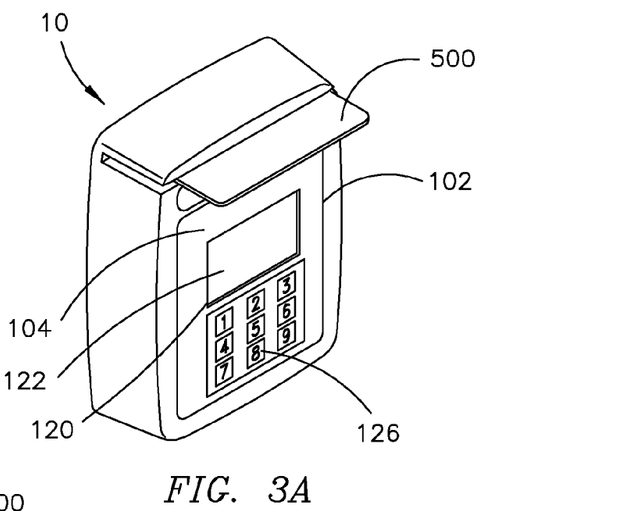
FIGS. 3A and 3B illustrate and show an exploded view of a reconfigurable payment device including the reader head guide assembly mounted in an alternative position to that seen in FIGS. 2A and 2B to enable the reading of an electronic payment tool/mag swipe card by the reader head guide assembly.
Figure 3B:
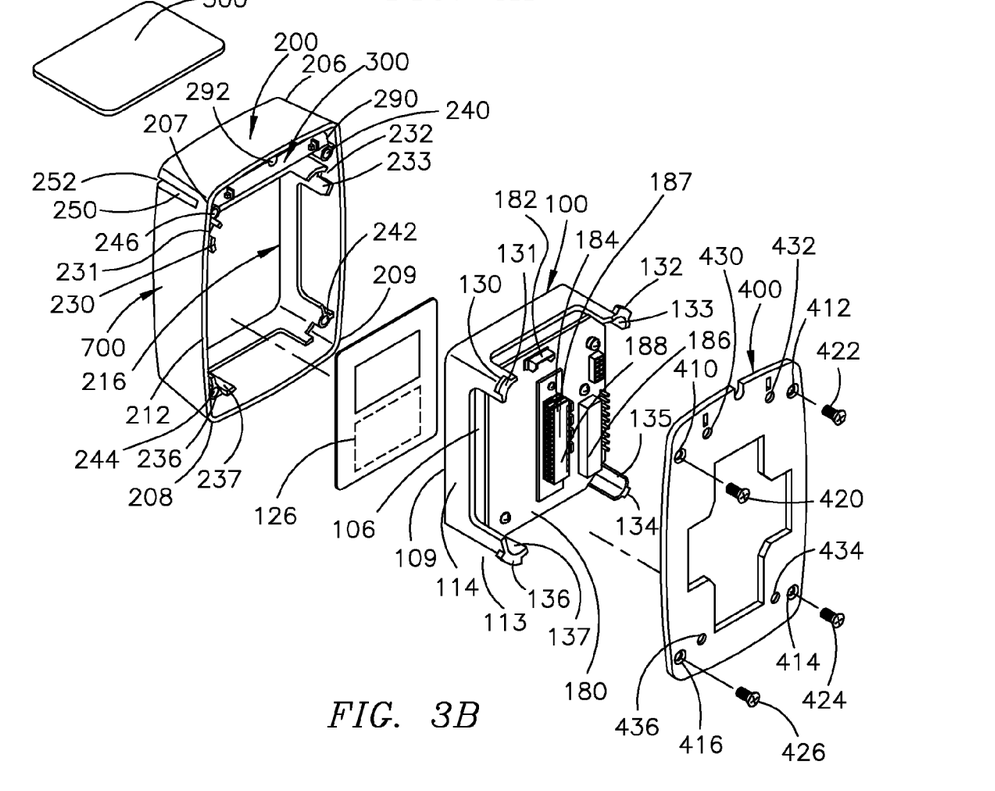
Figures 4A, 4B:
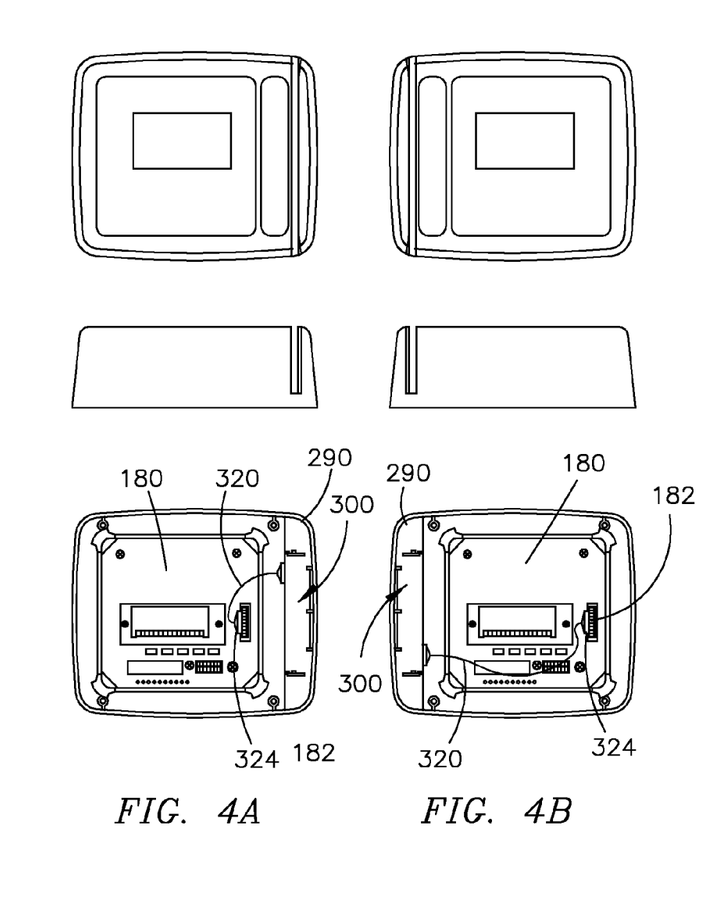
FIGS. 4a-4d are illustrations (back of device perspective) of the reconfigurable payment device, with the back plate removed, wherein the second housing and reader head guide assembly are presented in multiple orientations relative to and communicatively coupled with the first housing.
Figure 4C:
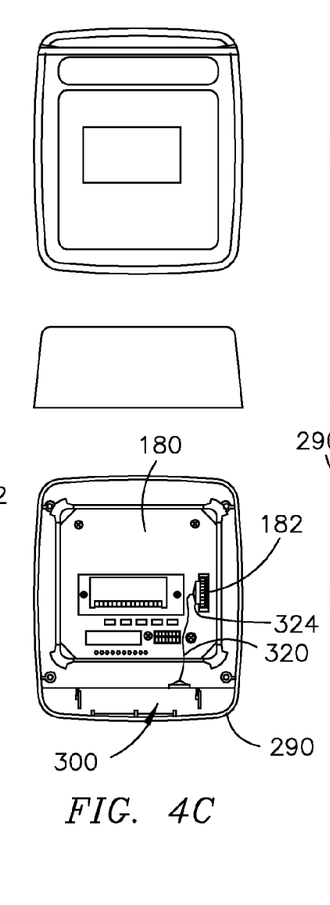
Figure 4D:
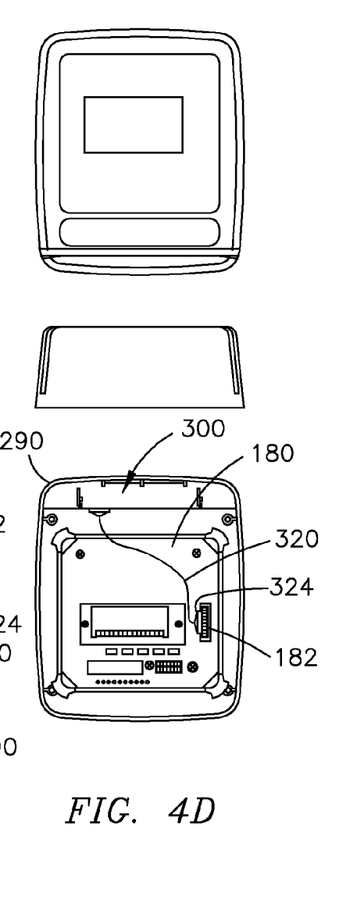

A component feature of the puck 100 is the display 122. The dimensional characteristics of the display 122 are as previously described and shown but may vary to accommodate desired design characteristics. As shown in FIGS. 1-3 the display configuration allows its establishment within the dimensional restraints of the access point 120. It is understood that the display 122 further defines the outer surface 104 of the puck 100. Alternatively, the display 122 may be established in a non-planar (not flush) relationship with the rest of the outer surface 104 of the puck plate 102. For instance, the display 122 surface may be recessed from the generally planar surface provided by the outer surface 104 of the puck plate 102. The display 122 may comprise various technologies, such as liquid crystal display (LCD), and other known technologies, to provide a visual display of information to a user. It is contemplated that the display 122 may use other technologies to enable user interaction with the device, such as through use of touch-screen technologies. It is understood that the dimensional characteristics of the display 122 may vary in accordance with the dimensions of the access point 120. The display 122 is not necessarily required to entirely occupy the dimensions of the access point 120, but that it provides a display of information, which is readable. In operation, where the device 10 is established for use with a particular machine, the display 122 is enabled to make interconnections to the machine, through the PCB 180, and is capable of operation using the wiring of the machine.

Other component features include the keypad overlay 126 on the outer surface 104. The keypad overlay 126 allows user interaction with the device 10 and further defines the outer surface 104 of the puck plate 102. The keypad overlay 126 generally covers the entire outer surface 104 of the puck 102, with a clear window allowing the display 122 to be viewed. Alternatively, the keypad overlay 126 may only partially encompass the outer surface 104 of the puck 100 and may be generally positioned on the outer surface 104, such as below the display 122, or in various positions about the outer surface 104. It is contemplated that other component features, such as buttons or other user interactive mechanisms, may further be included on and/or define the outer surface of the puck. Component features that are included on the outer surface 104 of the puck 100 can generally promote the planar nature of the outer surface 104 or may not. It is to be understood that the display 122, keypad overlay 126, buttons and/or other such user interactive mechanisms may provide contouring to and/or extend a certain distance above the plane of the outer surface 104 without diverging from the intent and operational performance needs of the device 10.

Connected to the inner surface 106 of the puck plate 102 is the printed circuit board (PCB) 180. It is contemplated that the PCB 180 be integrally or removably connected with the inner surface 106 of the puck plate 102. The PCB 180 is configured to fit within the dimensional restrictions of the inner surface 106, inner walls (112-115) and inner posts (130, 32, 134 and 136) that extend from the edges (107-110) of the inner surface 106. In embodiments of the current invention, the connection of the PCB 180 is made through the use of fasteners, such as screws, that connect to the inner surface 106 of the puck plate 102. It is contemplated that various connection mechanisms and technologies may be used to connect the PCB 180, and other device component features, with and/or to the inner surface 106 or other component features of the puck 100.

The PCB 180 is operationally coupled with the display 122 and keypad overlay 126 and provides a designed surface upon which other component features can be mounted and operationally coupled with various component features of the device 10 and/or machine to which the device 10 is communicatively connected. The component features of the PCB 180 can include one or more machine interface circuits, an internal power supply, wired or wireless communication (receipt and transmission) circuits and capabilities, a communication connector 182 (e.g., read head connector) and such other additional logical circuits/controls, adapters and connectors that enable desired functional capabilities of the device as may be contemplated. By way of example, it is contemplated that a connector to the PCB 180 be provided that allows for the reprogramming of the device. Additionally, the PCB 180 may include a connector for an radio frequency identification (RFID) reader and various other external devices.

The various component features of the PCB 180 enable the functionality of the device 10. This functionality may include acceptance of payment cards (i.e., magnetic stripe payment card type), gift/loyalty cards and non-payment cards (e.g., maintenance cards—these cards are not payment cards, they allow the reader to perform other tasks such as self-test and to place the machine into service mode). Wired or wireless communication to a transaction payment network and other network resources. Communication with laundry machines via both serial communication and discrete I/O interfaces (i.e., Pulse Mode). Connection to above mentioned optional RFID interface. Ability to receive input from a keypad and provide a display of information, such as user instructions and/or machine status, via LCD or other user perceptible technology. Ability to replace laundry connector board with other connector boards such as a multi drop bus (MDB) vending connector board to allow use with any MDB compliant vending machine, including soap dispensers and/or soda machines. Ability to control any other device that provides a serial payment communications channel, or a pulse payment interface, such as video games, car washes, water dispensers, and other unattended self-serve devices.

The four inner posts (130, 132, 134 and 136) and walls (112-115) extend a defined distance from the inner or bottom surface 106 to facilitate the secure connection, coupling and/or seating of the puck assembly 100 to, with and/or upon other objects, such as the second housing 200 (or "ring assembly) of the current invention. In the current embodiments the inner walls and posts of the puck 100 are integral with the inner surface 106 of the puck plate 102. The inner walls and posts are also integrally formed in connection with one another. Alternatively, it is contemplated that the walls and posts of the puck may be various inter-connectable component features. This may promote a modular approach to the construction and establishment of the walls, posts, puck and overall device of the current invention.

At the end of each post (130, 132, 134 and 136), furthest from the inner surface 106 of the puck plate 102, is a post tab or stop (131, 133, 135 and 137). As shown, the post tab or stop (131, 133, 135 and 137) is oriented in a generally perpendicular relation to the plane of the post and extends a distance from the post suitable for the performance of its function (described herein). It is understood that the orientation and dimensional characteristics of the stops (131, 133, 135 and 137), including the distance it extends from a post, may vary to accommodate the operational needs of the current invention. The stops (131, 133, 135 and 137) on the end of the posts (130, 132, 134 and 136) engage with or against other surfaces such as a stop (231, 233, 235 and 237) provided upon a post receiver (230, 23, 234 and 236) located on an inner surface 216 of the ring assembly 200 of the reconfigurable payment device 10. In operation the stops (131, 133, 135 and 137) engage or seat against the post receiver stop (231, 233, 235 and 237) to provide a position for the puck assembly 100 relative to the ring assembly 200 when the puck assembly 100 is inserted or seated within the ring assembly 200. It is understood that the position provided for the puck assembly 100 relative to the ring assembly 200 by the engagement of the post stops (131, 133, 135 and 137) with the post receiver stops (231, 233, 235 and 237) is intended as an operational position. To enable the repositioning capability of the reconfigurable electronic payment device 10 the physical connection provided by engaging the post stops (131, 133, 135 and 137) against the post receiver stops (inner ledges) (231, 233, 235 and 237) is one of a non-integral, non-locking, seated or temporary nature.

As will be discussed below, the joining of the puck 100 with the second housing 200 or other objects may occur using various technologies and means as contemplated by skilled artisans. For instance, the ring assembly 200 may include aspects of a snap-fit mechanism with connectors found on the inner posts of the second housing, to provide a physical joining of the ring assembly with other objects. In addition, it is also contemplated that the inner posts of the ring assembly 200 may engage along their length in a friction fit manner with other objects. Regardless of the connection mechanism and technology being employed the repositioning capability of the reconfigurable electronic payment device is maintained.

Where different connection mechanisms are being used to connect the first housing with other objects it is contemplated that it may include a release mechanism. The release mechanism can enable a user to release the ring assembly from its connection with another object. The use of alternative mechanisms to provide the release of the connection of the first housing with another object is contemplated, including manual, semi-automated and automated releasing means.

It is contemplated that the puck 100 may be variously configured wherein each of the different component features may be included together. For example, the puck 100 may include a back surface that is similar in nature to that of the device back plate 400 herein described below. The back surface may be integral or non-integral with the rest of the puck. Thus, the back surface may be connected with an end of the four inner posts through the use of fasteners, such as screws, or by integrally forming the back surface to the ends of the posts. Alternatively, the back surface may be connected with inner walls that extend from the inner surface. In other embodiments, the puck may be defined as only four posts that can directly connect with the various required component features for the device. The posts may be positioned to generally establish a square shape for the puck, similar to that shown in FIG. 1, but not be directly connected with one another.

It is further contemplated that where the puck 100 is established with a back surface it may be configured to include the physical connectors necessary to secure the connection of the puck with the ring. For instance, a ledge, multiple tabs or stops may be established about the back surface with can engage with features of the ring assembly to optimally position the puck when inserted or seated within the ring. The back surface may provide a generally "flanged" appearance relative to the rest of the puck when being established to connect with the ring. The back surface can allow for the use of fasteners, such as screws, to secure the connection of the puck with the ring. It can be that the use of fasteners optimally positions the puck within the ring or that the fasteners simply secure the connection. The use of fasteners in this manner still allows the device to be reconfigured. The back surface, when configured to promote the connection of the puck with the ring, may also be configured to provide at least a partially enclosed environment for the device. The back surface, similar to the back plate described below, can allow for the communicative coupling between the device and a machine to which it is operationally connected.

The current configuration establishes a partially enclosed puck environment through or within which component features for the device 10 are located. It is contemplated that the puck 100 may establish a fully enclosed environment within which the component features are located. The nature of the enclosure established by the puck assembly 100 may be defined in conformance with specifications provided and/or requirements to be complied with.

It is further contemplated that the design and construction of the puck 100 may be based upon conformance with various aesthetic requirements, such as the aesthetics of the location of use of the device. For instance, where a laundry machine is constructed to provide a non-linear aesthetic, the device, and therefore the puck, may be designed and constructed to match the non-linear nature of that laundry machine. Regardless of the nature of the configuration constructed for the puck, the surfaces and/or posts will still provide the foundation for the joining of the puck with the second housing.

As indicated above, the puck 100 is capable of being established using modular component feature(s). It is contemplated that to provide the reconfiguration capabilities and maintain the desired operational characteristics of the puck 100 that such a "modular" puck can be enabled with a first housing connection mechanism or assembly. In a similar manner to that shown in FIGS. 1-3, the first housing connection assembly can include physical connectors such as the four inner posts and walls that connect to the inner surface of the plate and then promote the coupling of the puck with the ring assembly. Alternatively, the modular first housing connection assembly may include only four posts or only four walls for connecting with the ring assembly. It is contemplated that other modular component features, such as various connectors, tabs and/or stops can be disposed about the puck to engage the puck with other objects, such as with the ring assembly. Still further, the number and dimensional characteristics of the posts and walls may vary as well as the location where such features are established on the puck. For instance, the height and thickness of the posts, walls and/or other modular component features may be varied to provide sufficient structural and/or performance support for the device.

The component features for the first housing connection mechanism are configured to connect with both the puck and other objects, such as the ring assembly. Thus, these component features can connect on one end with the inner surface of the plate of the puck and on the other end with the ring assembly. The manner of establishing the connection of these component features with other components of the reconfigurable device can occur through the use of various connecting mechanisms. For instance, a friction fit mechanism, snap-fit mechanism, compression lock mechanism, quick-release mechanism, and the like may be employed. It is contemplated that the connection mechanism employed will facilitate the release of a connection established between the component features and the puck or ring assembly.

Alternatively, the connectors of the first housing connection mechanism may enable or allow for a physical connection between the first housing and another object in a permanent or increasingly permanent manner. It is understood that the first housing connection mechanism is part of enabling the repositioning of the second housing about the first housing. The repositioning capability enabled by the first housing connection mechanism does not limit any other functional aspect performed by the reconfigurable electronic payment device of the current invention.

The first housing connection mechanism may be established on alternative features of the puck. For example, where the puck includes a back surface, the physical connectors may be included on the back surface. Thus, the back surface may include a physical connection mechanism that is a snap-fit connection mechanism allowing for connection between the first housing and second housing. It is further contemplated that the physical connection mechanism may be established in various locations about the puck without departing from the scope and spirit of the current invention. Other connection technologies, such as compression locks, quick release connectors, friction fit, and others may be employed upon the back surface or other various locations about the puck.

In embodiments of the current invention, such as those shown in FIGS. 1, 2, and 3 the second housing 200 is an outer housing that may be referred to as the "ring assembly" or "ring". The ring 200 is constructed from molded plastic materials. However, other materials and methods of construction may be used to accomplish construction of the ring 200.

The body of the ring 200 comprises four integral walls 202, 203, 204 and 205, including four corners 206, 207, 208 and 209, that generally establish a hollowed out assembly having a defined top surface 210, bottom surface 212, outer surface 214 and inner surface 216. The surfaces of the body may provide varying dimensional characteristics. For instance, in embodiments the bottom surface 212 is defined primarily as a circumferential edge while the outer surfaces 214 or sides of the device provide a nearly continuous wall that defines the depth of the ring 200, which enables its operation with the puck assembly 100.

The top surface 210 can be defined as establishing a generally planar surface area for the device 10. However, the top surface 210 does provide the operation and use of component features of the ring assembly 200 and the puck assembly 100.

The top surface 210 is enabled to provide access for the swiping of an electronic payment tool (a magnetic payment card, such as a credit/debit card, gift or loyalty card) by a magnetic card receiver 250 (the "mag card receiver" or "receiver"). The receiver 250, enabling the swiping of the electronic payment tool through the device 10, establishes a slot 252 along a length of the body extending a certain depth from the top surface 210 towards the bottom surface 212. A plate 270 may be connected with or integral to an area of the top surface 210 of the body. The plate 270 may provide information to a user of the device 10, such as instructions for using the device. The inner surface 216 includes various component features disposed upon it. As shown, integral with the inner surface 216 are four post receivers 230, 232, 234 and 236, four back plate connectors 240, 242, 244 and 246 and a reader head guide assembly adapter 290. Other component features can be included upon the surfaces of the ring assembly 200 and, as described herein, the various component features can include additional aspects.

The top surface 210 is further defined by a puck assembly receiver 240, which is generally established as a space within the top surface 210 that extends through and creates a hollow within the top surface 210 of the ring 200. The dimensions of this access space 240 are defined to enable the operation of the puck assembly 100 when it is seated within the ring 200. This includes providing for the viewing of and access to the display 122 and/or keypad overlay 126 of the puck 100. The access space 240 dimensional characteristics can be adjusted to accommodate variations in dimensions of different puck designs.

The general shape of the ring 200 is established to allow for the connection of the ring 200 with the puck 100. Therefore, overall conformance between the shape of both the puck 100 and ring 200 can be a critical aspect of the current invention. However, it is contemplated that the overall shape of the puck may differ from the overall shape of the ring without departing from scope and spirit of the current invention. The dimensional characteristics of the ring 200 comprising the length, width, and height of its various surfaces, are consistent with industry standard requirements that are met by the electronic payment device 10 of the current invention. It is understood that the surfaces and component features of the ring may be constructed and comprise various dimensional characteristics. It is further contemplated that changes may be made to the generally planar nature of the top surface of the ring without diverging from the intent and operational performance needs of the current invention.

It is contemplated that various additional component features and/or technologies may be included within the ring 200 without diverging from the intent and scope of the current invention. For instance, a status indication assembly may be included in the ring. The status indication assembly can comprise visual indicators that can be perceived by a user to inform the user of the current operational status of the device. In one example, the visual indicators may be one or more LEDs that indicate the status of the swipe reader (e.g., green for ready, red for busy, flashing while reading, and the like).

The various surfaces and component features of the ring 200 herein described are generally integral with one another. Thus, each provides a continuous surface for the ring 200. It is alternatively contemplated that the surface and/or component features of the body of the ring may be modular surface and/or component features capable of being interconnected with and to one another. Thus, it is contemplated that various different surface and/or component features, having various different dimensional characteristics, can be used to establish the ring and to provide the reconfiguration capabilities of the device of the current invention.

The current configuration of the inner surface 216 of the ring 200 establishes a partially enclosed ring environment through or within which the puck assembly 100 may be seated. It is contemplated that the ring 200 may establish a more enclosed or open environment within which the puck assembly 100 and other component features may be seated and located. The nature of the enclosure established by the ring and/or puck assembly may be defined in conformance with specifications provided and/or requirements to be complied with.

It is further contemplated that the design and construction of the ring 200 may be based upon conformance with various aesthetic requirements, such as the aesthetics of the location of use of the device. For instance, where a laundry machine is constructed to provide a non-linear aesthetic, the device, and therefore the ring, may be designed and constructed to match the non-linear nature of that laundry machine. The defined surfaces and post receivers may be of an integral or non-integral nature, regardless they provide the foundation for the joining of the ring with the first housing or other objects. As will be discussed below, the joining of the ring with the first housing or other objects may occur using various means as contemplated by skilled artisans.

The top surface 210 of the ring 200 is a generally planar, unbroken surface that promotes and is in conformance with the generally planar nature of the top surface of the puck 100. As indicated above, contained within the second housing 200 is the mag card reader 250 component feature that allows for a card swipe during the performance of an electronic payment transaction. The mag card reader 250 is established as a slot 252 within the second housing 200. The slot 252 opens through the top 210 and outer 214 surfaces of the second housing 200 and extends a determined distance into the second housing 200. The distance the slot 252 extends enables the capture of information from the magnetic stripe contained on an electronic payment tool that is passed through the card swipe reader 252. It is to be understood that this distance into the second housing 200 that the slot 252 extends may vary, but in no case shall the distance prohibit the passage of the magnetic stripe of and capture of information from the electronic payment tool 500.

The inner surface 216 includes a reader head guide assembly receiver 290 (the "reader head receiver") for receiving a reader head guide assembly 300. The reader head receiver 290 provides a location within the inner surface 216 of the ring 200 within which the reader head guide assembly 300 may be seated. It is further contemplated that the reader head receiver 290 include a connector which may be engaged by a fastener, such as a screw, that also engages with the reader head guide assembly 300 and secures its position. Other mechanisms for securing the position of the reader head guide assembly 300 relative to the rest of the ring assembly 200 and/or within the reader head receiver 290 may be used without departing from the scope and spirit of the current invention. For instance, it may include a snap-fit mechanism or enable a friction-fit type engagement with the reader head guide assembly.

The reader head receiver 290 locates the reader head guide assembly 300 in proper position relative to the mag card receiver 290. In operation, the mag card receiver 290 allows a user to swipe the magnetic stripe of their electronic payment tool 500 (e.g., a card) through the device 10. The reader head receiver 290 enables the reader head guide assembly 300, during the swipe of the card, to perform its function of reading information stored on the magnetic stripe of the card. The reader head guide assembly 300 can also "read" information from various electronic payment tools such as credit and/or debit cards or other such tools that store information on a magnetic stripe for reading by a device.

As described previously, the reader head guide assembly 300 seats within the ring 200 in relation to the reader head receiver 290 that enables the swipe of a magnetic stripe of an electronic payment tool 500. This reader head guide assembly 300 enables the capture of information from the magnetic stripe when swiped through the adapter. It is contemplated that the reader head guide assembly may provide an encryption capability. For instance, the reader head guide assembly 300 can encrypt the information gathered from the swiping of a mag swipe card before that information is communicated. Other reader head guide assemblies may be employed by the current invention that use bit/strobe or other SPI interface heads.

The reader head guide assembly 300 is able to communicate this information to the PCB 180 through use of a standard communication assembly 320 that includes a cable 322 which plugs into the communication connector 182 (reader head connector) located on the PCB 180. Various communication technologies and/or assemblies may be employed with the current invention. As can be seen in FIGS. 4A-4D, the current invention uses an SPI serial cable 322 connected with the proper functional aspects of the reader head guide assembly 300 on one end and with an adapter 323 on the opposite end. The adapter 323 then plugs into the PCB 180 of the puck assembly 100. This communication assembly 320 is capable of allowing and/or maintaining the communicative coupling between the reader head guide assembly 300 and the PCB 180 regardless of the different configurations established by the device 10. It is contemplated that the length of the cable 322 may be a determining factor in the size of the puck assembly 100.

Disposed about and connected with the inner surface 216 are four post receivers 230, 232, 234 and 236. The post receivers extend a defined distance along the inner surface 216 between the top 210 and bottom 212 surfaces of the ring 200 to facilitate connection of the ring 200 with other objects, such as the puck 100. In embodiments, the posts 130, 132, 134 and 136 of the puck 100 seat loosely within the post receivers 230, 232, 234 and 236 of the ring 200. It is understood that the end of the post receivers nearest the bottom surface 212 of the ring 200 include post receiver stops 231, 233, 235 and 237 which engage with the post stops 131, 133, 135 and 137 found on the ends of the posts 130, 132, 134 and 136 on the puck 100. This manner of engagement provided between the ring 100 and puck 200 assemblies promote the ease with which the puck 100 may be removed from and repositioned in relation to the ring 200 and thus the reconfiguration capability provided by the device 10 of the current invention. The dimensional characteristics of the post receivers 230, 232, 234 and 236 and post receiver stops 231, 233, 235 and 237 are determined to provide engagement with the posts and post stops that position the front or top surface of the puck (i.e., display and keypad overlay) in a generally planar alignment with the top surface of the ring. It is further understood that the dimensions of both the post receivers 230, 232, 234 and 236, post receiver stops 231, 233, 235 and 237, posts 130, 132, 134 and 136 and post stops 131, 133, 135 and 137 allow for the connection of the back plate 400 with the ring 200 in the manner described below.

In embodiments, two of the post receivers are located at the two corners of the ring body opposite the location of the mag card receiver 290 and on opposite walls from each other. Another two post receivers are located proximal to the mag card receiver 290 of the ring 200 and on opposite walls from each other. It is contemplated that the number and location of the post receivers may vary to accommodate different post positioning and/or design needs without departing from the scope and spirit of the current invention.

As discussed above in reference to the posts of the puck, the posts of the puck and post receivers of the ring may include or enable various connection mechanisms and technologies. These may include a snap-fit mechanism, quick-release mechanisms, compression lock mechanism, friction-fit mechanism, and the like. In addition, the post receivers may include and/or enable various other mechanisms, such as release mechanisms. It is understood that the mechanisms and features that can be included with the device and/or upon the post receivers promote the reconfiguration capabilities of the device of the current invention.

Four back plate connectors 240, 242, 244 and 246 are disposed about and connected with the inner surface 216 of the ring. These connectors are capable of being engaged by a fastener, such as a screw as shown, to promote the secure positioning of the back plate 400 relative to the ring 200 and puck 100. In embodiments, two of the connectors are located at the two corners of the body opposite the location of the mag card receiver 290 and on opposite walls from each other. Another two connectors are located proximal to the mag card receiver 290 of the ring 200 and on opposite walls from each other. It is contemplated that the number and location of the connectors may vary to accommodate different design needs without departing from the scope and spirit of the current invention.

A back plate 400 provides the back surface for the reconfigurable payment device 10. The back plate may 400 be constructed of various materials, including but not limited to metals, plastics or other similar materials that meet the functional and structural requirements for the device. The back plate 400 includes ring connectors 410, 412, 414 and 416 that promote the connection of it with the ring assembly 200. In embodiments, the ring connectors 410, 412, 414 and 416 of the back plate enable the use of fasteners, such as screws, to engage or pass through them and further engage with the back plate connectors 240, 242, 244 and 246 included on the inner surface 216 of the ring assembly 200 (discussed above). The fasteners assist in securing the back plate against the ring assembly. Further, the connection of the back plate 400 with the ring assembly 200 can provide a compression fit that holds the post tabs or stops 131, 133, 135 and 137 on the inner posts 130, 132, 134 and 136 of the puck 100 against the corresponding post receiver stops or ledges 231, 233, 235 and 237 found on the post receivers 230, 232, 234 and 236 of the ring 200. Four compression pads can be disposed upon the back plate 400, as shown in FIG. 2, and are designed to engage against the post stops 131, 133, 135 and 137 of the puck 100 when the back plate 400 is connected to the ring 200. Thus, the back plate 400 assists in the proper positioning of the puck 100 within the ring 200, thereby further promoting the operation of the device 10. As contemplated, alternative mechanisms for securing the positioning of the puck within the ring may be employed without departing from the scope and spirit of the current invention.

The back plate 400 also promotes the mounting of the device 10 upon various machines and/or surfaces. A mounting assembly, comprising a first 430, second 432, third 434, and fourth 436 mounting receivers, is provided by the back plate 400. It is contemplated that various other mechanisms, such as brackets, holders, and the like may be used to mount the device of the current invention. Further, the back plate 400 includes a communications passage 450 that allows for the communicative coupling of the device 10 with another object, such as a machine upon which it may be mounted. In operation the passage 450 can allow for connection with the PCB 180 of the device 10 by cables, wires, or other communication equipment that is also connected with the machine to which the device 10 is mounted. The dimensions of the passage 450 may vary to accommodate design and/or operational needs.

The device 10 may be mounted on various surfaces, including a surface(s) provided by a machine to which the operation of the device is associated. For example, the device 10 may be mounted to a washer and/or dryer machine, vending machine and other objects which may utilize the electronic payment transactions capabilities provided by the device 10. A mounting assembly, provided by the back plate 400 of the current invention, may allow the device 10 to be mounted upon machines and/or surfaces. It is contemplated that a mounting assembly may be provided by the second housing 200 of the current invention. It is further contemplated that the mounting assembly is provided by an operational conjunction of both the back plate 400 and second housing 200. It is to be understood that the mounting assembly may be removably connectable with or integral with either or both the back plate 400 and second housing 200.

The ring assembly 200 can be enabled with a second housing connection mechanism. In a similar manner to that shown in FIGS. 1-3, the second housing connection assembly can include physical connectors such as the four post receivers, four back plate connectors and various surfaces and/or walls that connect to and with the inner surface 216 of the ring 200 and then promote the coupling of the ring 200 with the puck assembly 100 and back plate 400. Alternatively, the second housing connection assembly may include only four post receivers or only four walls for connecting with the puck assembly and back plate. It is contemplated that other component features, such as various connectors, tabs and/or stops can be disposed about the ring 200 to engage the ring with other objects, such as with the puck assembly 100 and back plate 400. The component features, and therefore the second housing connection mechanism, may be established in a modular manner providing the capability for these features to be connected and/or removed from the ring assembly 200.

Still further, the number and dimensional characteristics of the post receivers, back plate connectors, walls and/or surfaces may vary as well as the location where such features are established on the ring 200. For instance, the height and thickness of the post receivers and/or other modular component features may be varied to provide sufficient structural and/or performance support for the device 10.

The component features for the second housing connection mechanism are configured to connect with the ring 200, puck 100, back plate 400 and other objects as desired. Thus, these component features can connect on one end with the inner surface 216 of the ring 200 and on the other end with the puck assembly 100 and/or back plate 400. These features may be established in various locations about the inner surface 216 or on alternative features of the ring 200 and may employ various connection mechanisms to accomplish its function. The manner of establishing the connection of these component features with the ring 200 and other components of the reconfigurable device 10 can occur through the use of various connecting mechanisms. For instance, a friction fit mechanism, snap-fit mechanism, compression lock mechanism, quick-release mechanism, and the like may be employed.

It is contemplated that the second housing connection mechanism employed will facilitate the release of a connection established between the ring 200, puck 100, back plate 400, and/or other objects. Where the connection of the second housing with another object is of a temporary nature the second housing connection mechanism may include a release mechanism. The release mechanism can enable the connectors of the second housing to disengage from the connectors of another object. The use of alternative mechanisms to provide for the release of the connection of the second housing with another object is contemplated, including manual, semi-automated and automated releasing means.

Alternatively, the connectors of the second housing connection mechanism may enable or allow for a physical connection between the second housing and another object in a permanent or increasingly permanent manner. It is understood that the second housing connection mechanism is part of enabling the repositioning of the second housing about the first housing. The repositioning capability enabled by the second housing connection mechanism does not limit any other functional aspect performed by the reconfigurable electronic payment device of the current invention.

As shown and described, the first and second housings establish an overall shape for the device. In the embodiments shown in FIGS. 1*a*-1*h* the shape is generally of a cube or squared cube. In this configuration, the ring 200 can be oriented in any of four orientations relative to the puck 100, such that the swipe card reader is located to the right, left, bottom or top of the device. This allows the direction of a card swipe to be changed to avoid physical impediments, such as coin vaults, doors, or other obstructions, while leaving the orientation of the display and user input buttons constant.

In order to allow the rotation of the ring 200 around the puck 100, the outer dimensions of the puck 100 and inner dimensions of the ring 200 are similar when rotated 90°, 180° and 270°. These puck and ring dimensions have tolerances for assembly. To maximize the operational efficiency of the device 10, the device 10 can exhibit a reflective symmetry along both the X and Y axes. Without compromising the operations of the device 10 this symmetry may be altered to any extent contemplated.

The current invention contemplates alternative geometries for the shape of the device 10. The device 10 may be configured in a generally triangular shape. It is further contemplated that the device 10 may be established in various other polygonal shapes, such as a pentagon, hexagon, octagon and other shapes, as are known and contemplated. Additionally, the shape of the device 10 may be established generally as a circle or modified circle. It is to be understood that any shape may be given the device 10 so long as operational performance is maintained.

While primarily designed for the laundry industry, the device 10 can be used for any electronic payment or non-payment transaction need, such as small value purchase payment, loyalty/gift card use, maintenance card use and the like, where flexibility in swipe direction is needed, including but not limited to vending and arcade gaming machines.

Figure 5:
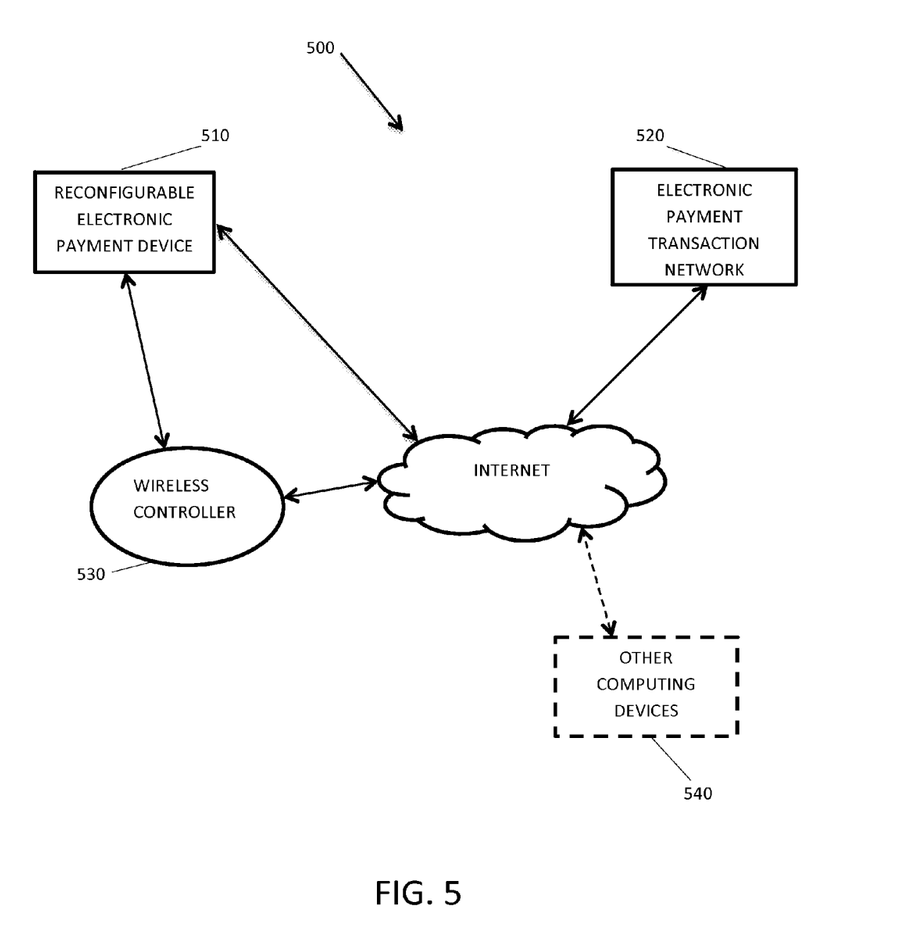
FIG. 5 is a representative illustration of a wireless electronic payment system including a reconfigurable payment device in communication with an electronic payment transaction processing network.

An electronic credit and/or debit transaction system 500 is provided in an embodiment of the current invention, as shown in FIG. 5. In an embodiment, the system comprises a reconfigurable electronic payment device 510 in communication with an electronic payment transaction processing network 520. The means by which communication between the device and network are established may be any standard means, such as wired or wireless communication protocols, known to those skilled in the art. The electronic payment transaction processing network includes all necessary resources, authorities and capabilities for execution of an electronic credit and/or debit transaction.

It is contemplated that the system includes a wireless communications capability to enable communication between the device and other computing devices 540, controllers 530 and/or networks, such as the electronic payment network 520. The wireless capability may include the addition of a wireless communication technology into the electronic payment device 510 of the current invention. Thus, this technology may be included on the PCB of the current invention. The technology may be industry standard and/or include customized features and capabilities.

For example, a system with wireless capability for the current invention may comprise one or more of the reconfigurable electronic payment devices 510 of the current invention operationally connected with a machine (not shown), a wireless controller device 530, and an electronic payment transaction network 520. As shown in the system embodiment of FIG. 5, the operational connection amongst the various components of the system 500 can be established via communication over the Internet. It is contemplated that the wireless controller device 530 is in communication with an additional computing device 540. The reconfigurable electronic payment devices 510 can wirelessly communicate with the wireless controller 530, providing information to and receiving information from the wireless controller 530. The wireless controller 530 is also in communication with the transaction network 520 and any additional computing device(s). The system can execute electronic financial transactions through each device and control the operation of the machine to which the device is operationally coupled. The system can also provide additional capabilities. For instance, the system can allow users (cardholders/transaction requestors) to manage user's account, add value, view machine (i.e., laundry) status and establish alerts when the machine has finished. The system can allow operators (owners/vendors) to access transaction information, machine status and activity in a location. The functional capabilities of the system are provided on-demand and in real-time. This allows the users and operators to access and receive information regarding individual machine use and status, as well as information about multiple machines that can be located in one or more different locations or rooms.

As described previously, it is contemplated that various other system features and/or devices, such as an RFID module, may be included within the system of the current invention without diverging from the intent and scope of the system.

The systems and methods of the current invention may use various communication protocols and networks, from the Internet, to intranets, proprietary networks and such other platforms as may be contemplated for use. It is contemplated that the device may be in communication, either wired or wirelessly, with various other computing devices. These other computing devices can provide additional information to users and operators. In a laundry machine operating environment, this additional information may include the status of a wash cycle being performed or an update regarding the operational status of a machine, such as whether it is functioning properly.

Figure 6:
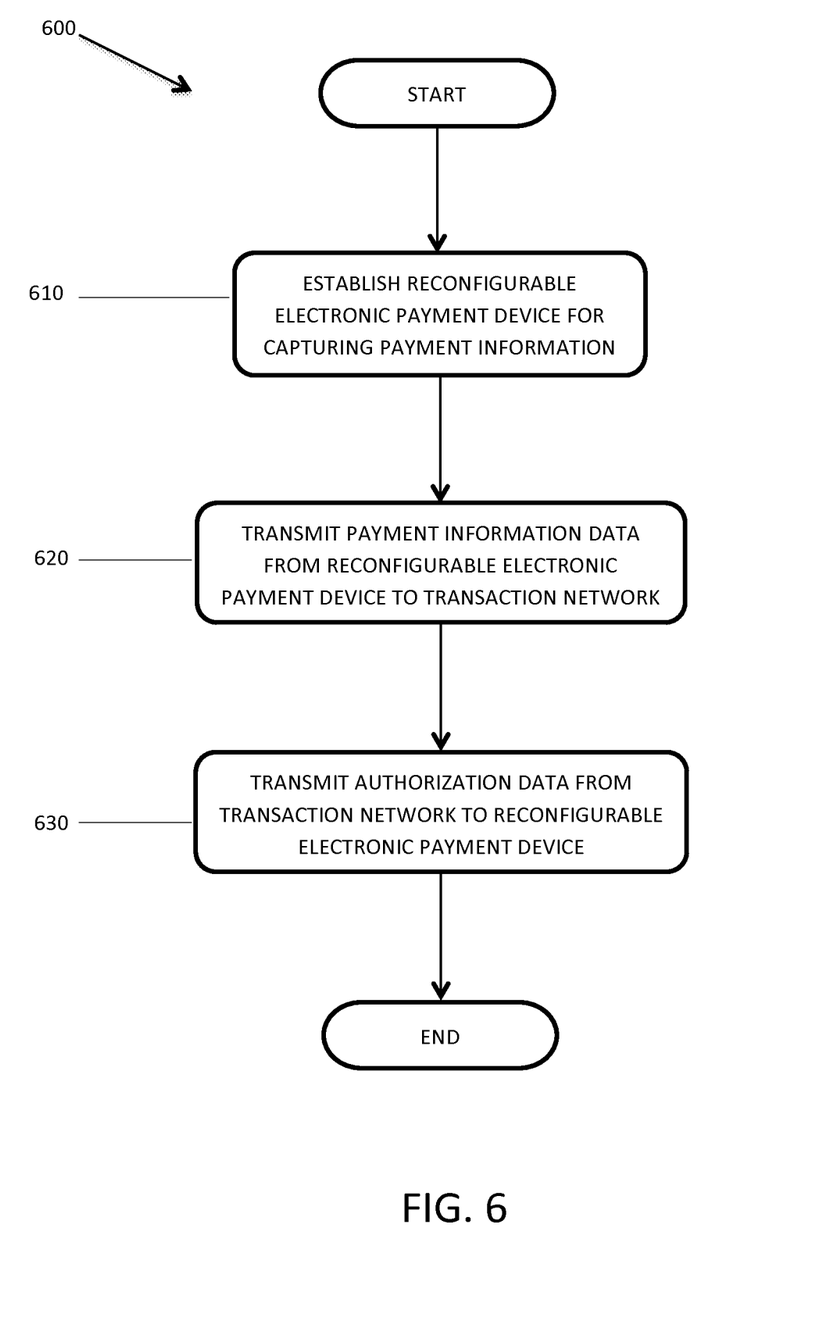
FIG. 6 is a block diagram illustrating a method for the performance of an electronic payment transaction.

The current invention provides a method 600 for performing an electronic credit or debit payment transaction, shown in FIG. 6. In a first step 610 a reconfigurable electronic payment device is established in a physical location that allows for the capture of payment information. This may include establishing the reconfigurable electronic payment device upon a laundry machine. Alternatively, this may include establishing the device on various types of vending machines, kiosk structures, as a stand-alone device, upon a wall or any other structure as is contemplated for the device of the current invention. In a second step 620 the payment information is transmitted to an electronic payment transaction processing network. The execution of all required steps for the performance of an electronic transaction, outside that performed by the device of the current invention, is carried out by and over the network. It is contemplated that the device may communicate with various networks and protocols established by those networks. This may include, but should not be interpreted as limited to, various security/encryption protocols that may be promulgated over an electronic payment transaction network. In a third step 630, transaction authorization information is transmitted from the electronic payment transaction processing network to the device.

Additional method steps may include the transmission of payment information to a wireless controller device and then transmission from the wireless controller device to an electronic payment transaction network. It is further contemplated that the transaction authorization may be transmitted form the network to an alternative location, such as the wireless controller and/or other computing devices. After the authorization information is transmitted to the device, the device through its logic controls may authorize the performance of a task. Where a device is mounted and in communication with a laundry machine, the authorized task may be for the machine to perform a wash and/or dry cycle. In a vending environment it may authorize the dispensing of a product. Where the authorization information transmitted to the device is a denial of the requested transaction then the user may be prompted to take additional steps. The additional steps may include, displaying a request on the display for the user to provide an alternative form of payment. Other method steps, as may be contemplated by those skilled in the art, can be performed without departing from the scope and spirit of the current invention.

The description and drawings are illustrative, non-limiting and give numerous specific details to provide a thorough understanding of the current invention. To enhance clarity of understanding, well known or conventional details, in certain circumstances, are not described.

Reference(s) to or the appearance of the phrase "one embodiment" or "an embodiment" means at least one and that they are not necessarily all referring to the same embodiment nor that separate or alternative embodiments must be mutually exclusive of other embodiments. It does mean that a particular feature, structure, or characteristic described in connection with the embodiment is included in at least one embodiment but not necessarily included in all. Similarly, various requirement are described which may be requirements for one embodiment but not other embodiments. Unless excluded by explicit description and/or apparent incompatibility, any combination of various features described in this description is also included herein.

Any disclosure of patent documents provided is hereby incorporated by reference. Use of headings is intended to ease reference and must not be interpreted as limiting any disclosure provided.

It is understood that the description of the processes, systems, methods and capabilities of the current invention have been set forth in a particular order or ordered sequence, but that such could be practiced in various alternative order or sequence to that herein described. Further, the capabilities executed (steps taken) and results provided may be performed simultaneously, other capabilities could be added, or that certain capabilities could be omitted.

Accordingly, the specific embodiments illustrated in the specification and drawings should not be regarded in a restrictive sense, but instead as exemplary. Further, various modifications may be made to these exemplary embodiments without departing from the broader scope and spirit of the current invention as recognized by those of ordinary skill in the field.

What is claimed is:

1. A reconfigurable payment device, comprising:
   a puck assembly including a printed circuit board having logic and communication circuitry for processing and communication of information received in performance of an electronic transaction; and
   a ring assembly operationally coupled with the puck assembly, the ring assembly including a reader head receiver and reader head guide assembly positioned in a right orientation relative to the puck assembly, the reader head guide assembly captures information from an electronic tool swiped through the reader head receiver by a user of the tool, the reader head guide assembly communicating captured information to the printed circuit board of the puck assembly for processing and communication of information in performance of the electronic transaction, wherein the ring assembly can be rotated about the puck assembly and repositioned relative to the position of the puck assembly; and
   a back plate assembly that connects with and secures the position of the ring assembly in the established orientation relative to the position of the puck assembly, wherein the back plate enables the operational coupling of the device to a machine.

2. The device of claim 1, wherein the ring assembly, including the reader head receiver and reader head guide assembly, can be rotated and repositioned in a left orientation, top orientation and bottom orientation relative to the position of the puck assembly.

3. The device of claim 1, wherein the ring assembly can be rotated and repositioned in 90° increments about the puck assembly.

4. The device of claim 1, wherein the device processes and communicates information related to electronic transactions including electronic payment transactions, non-payment transactions, user management and administration of the device.

5. The device of claim 1, wherein the electronic tool can include a credit card, debit card, gift card, loyalty card, maintenance card, or other tools that store electronic information on a magnetic stripe which may be captured in the performance of electronic transaction by the reader head guide assembly by swiping the tool through the reader head receiver.

6. The device of claim 1, wherein the reader head guide assembly includes a communication assembly with a serial cable for communicatively connecting with the printed circuit board of the puck assembly.

7. The device of claim 1, wherein the device is communicatively coupled via a wired or wireless communications capability with the machine and an electronic payment transaction network.

8. The device of claim 7, wherein the device wirelessly communicates with a controller of an electronic payment transaction processing network.

9. The device of claim 1, wherein the device further comprise:
  a display for presenting information to the user; and
  a keypad overlay that enables the user to interact with the device.

10. The device of claim 1, further comprising a connector for interfacing with a radio frequency identification reader.

11. The device of claim 1, wherein the device encrypts information received.

12. The device of claim 1, wherein the puck assembly includes a modular first housing connection mechanism for operationally coupling the puck assembly with other component features of the device and a machine.

13. The device of claim 1, wherein the ring assembly includes a modular second housing connection mechanism for operationally coupling the ring assembly with other component features of the device and a machine.

14. The device of claim 1, further comprising a status indication assembly.

15. The device of claim 1, further comprising an AC or DC power supply from 9V to 30V.

16. The device of claim 1, further comprising a 110 VAC and 220 VAC power adapter through which power can be provided to the device.

17. The device of claim 1, wherein the device receives power from the machine.

18. The device of claim 1, wherein the machine can include a laundry machine, a multi drop bus (MDB) compliant vending machine and any other device that provides a serial or pulse communications channel with the device, such as video games, car washes, water dispensers, and other unattended self-serve machines.

19. A system for performing an electronic transaction, comprising:
  a reconfigurable payment device, wherein the device further comprises:
    a puck assembly including a printed circuit board having logic and communication circuitry for processing and communication of information received in performance of an electronic transaction; and
    a ring assembly operationally coupled with the puck assembly, the ring assembly including a reader head receiver and reader head guide assembly positioned in a right orientation relative to the puck assembly, the reader head guide assembly captures information from an electronic tool swiped through the reader head receiver by a user of the tool, the reader head guide assembly communicating captured information to the printed circuit board of the puck assembly for processing and communication of information in performance of the electronic transaction, wherein the ring assembly can be rotated about the puck assembly and repositioned relative to the position of the puck assembly;
    a back plate assembly that connects with and secures the position of the ring assembly in the established orientation relative to the position of the puck assembly, wherein the back plate enables the operational coupling of the device to a machine;
  a controller of an electronic payment transaction processing network communicatively coupled with the device, wherein the controller can receive and transmit electronic information related to an electronic transaction request received from the device; and
  an electronic payment transaction network, communicatively coupled with the controller, wherein the network can process electronic transaction requests received and provide a transaction authorization in resolution of the request to the device.

20. A process for performing an electronic payment transaction, comprising:
  establishing a reconfigurable payment device in a location that allows for the capture of information from an electronic tool, wherein the reconfigurable payment device further comprises:
    a puck assembly including a printed circuit board having logic and communication circuitry for processing and communication of information received in performance of an electronic transaction; and
    a ring assembly operationally coupled with the puck assembly, the ring assembly including a reader head receiver and reader head guide assembly positioned in a right orientation relative to the puck assembly, the reader head guide assembly captures information from the electronic tool swiped through the reader head receiver by a user of the tool, the reader head guide assembly communicating captured information to the printed circuit board of the puck assembly for processing and communication of information in performance of the electronic transaction, wherein the ring assembly can be rotated about the puck assembly and repositioned relative to the position of the puck assembly;
    a back plate assembly that connects with and secures the position of the ring assembly in the established orientation relative to the position of the puck assembly, wherein the back plate enables the operational coupling of the device to a machine;
  transmitting payment information from the reconfigurable device to an electronic payment transaction processing network; and receiving transaction authorization information from the network by the device.

\* \* \* \* \*